US009524071B2

(12) United States Patent
Auer et al.

(10) Patent No.: US 9,524,071 B2
(45) Date of Patent: Dec. 20, 2016

(54) THRESHOLD VIEW (71) Applicant: Microsoft Corporation, Redmond, WA (US)

(72) Inventors: Nathaniel E. B. Auer, Bellevue, WA (US); Nicholas S. Smith, Seattle, WA (US); Jonathan A. McPherson, Redmond, WA (US); Jane T. Kim, Seattle, WA (US); Gail Giacobbe, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 165 days.

(21) Appl. No.: 13/759,044

(22) Filed: Feb. 5, 2013

(65) Prior Publication Data
US 2014/0223311 A1 Aug. 7, 2014

(51) Int. Cl.
*G06F 3/0482* (2013.01)
*G06F 3/048* (2013.01)
*G06Q 10/10* (2012.01)

(52) U.S. Cl.
CPC ............ *G06F 3/048* (2013.01); *G06F 3/0482* (2013.01); *G06Q 10/10* (2013.01); *G06Q 10/1093* (2013.01); *G06Q 10/1095* (2013.01)

(58) Field of Classification Search
CPC ................................ G06F 3/048; G06F 3/0482
USPC ........................................................ 715/730
See application file for complete search history.

(56) References Cited

U.S. PATENT DOCUMENTS

| 5,745,110 A | 4/1998 | Ertemalp | |
| 7,100,123 B1* | 8/2006 | Todd et al. | 715/862 |
| 7,590,947 B1* | 9/2009 | Gay et al. | 715/800 |
| 7,693,720 B2* | 4/2010 | Kennewick | G06F 17/30654 704/257 |
| 7,802,206 B1* | 9/2010 | Davis | H04M 1/274525 345/156 |
| 8,069,417 B2 | 11/2011 | Brush et al. | |
| 8,364,133 B1* | 1/2013 | Lucey | H04L 65/403 379/205.01 |
| 8,930,820 B1 | 1/2015 | Elwell et al. | |
| 2003/0061087 A1 | 3/2003 | Srimuang | |
| 2005/0125570 A1* | 6/2005 | Olodort | G06F 1/162 710/15 |
| 2006/0004732 A1 | 1/2006 | Odom | |
| 2007/0061488 A1* | 3/2007 | Alagappan et al. | 709/246 |

(Continued)

OTHER PUBLICATIONS

App Reviews—CrazyMikesapps.com, "HATCHEDit Shareable Calendar Phone App Review (Free App)—CrazyMikesapps", published Apr. 8, 2012, https://www.youtube.com/watch?v=M2EMXZiR-cl.*

(Continued)

*Primary Examiner* — Reza Nabi
*Assistant Examiner* — Daniel Rodriguez
(74) *Attorney, Agent, or Firm* — Anand Gupta; Tom Wong; Micky Minhas (57) ABSTRACT The description relates to threshold views. One example can include a display, storage and a processor. The storage can store instructions for execution by the processor. The processor can be configured to process the instructions to create a graphical user interface (GUI) on the display. The GUI can include a threshold view that shows elements that relate to a family on a given day. The elements can include time bound elements, semi-time bound elements and non-time bound elements.

15 Claims, 11 Drawing Sheets

(56) References Cited

U.S. PATENT DOCUMENTS

| | | | | |
|---|---|---|---|---|
| 2007/0168892 A1* | 7/2007 | Brush | G06Q 10/109 | 715/751 |
| 2007/0198314 A1* | 8/2007 | Andrew et al. | | 705/8 |
| 2007/0260503 A1* | 11/2007 | Pan | G06Q 10/109 | 715/772 |
| 2007/0282595 A1* | 12/2007 | Tunning | G06F 3/0481 | 704/9 |
| 2008/0005168 A1* | 1/2008 | Huff et al. | | 707/104.1 |
| 2008/0021954 A1* | 1/2008 | Matteo | G06Q 10/109 | 709/203 |
| 2008/0028036 A1 | 1/2008 | Slawson et al. | | |
| 2008/0059881 A1* | 3/2008 | Scott | G06F 3/0481 | 715/703 |
| 2008/0159491 A1* | 7/2008 | Kelley | G06Q 10/107 | 379/88.16 |
| 2008/0201647 A1* | 8/2008 | Lagerstedt | G01W 1/02 | 715/748 |
| 2008/0209344 A1* | 8/2008 | Knapp | G06Q 10/1095 | 715/751 |
| 2008/0244425 A1* | 10/2008 | Kikin-Gil | G06Q 10/109 | 715/764 |
| 2008/0307323 A1* | 12/2008 | Coffman | G06Q 10/109 | 715/753 |
| 2009/0040875 A1* | 2/2009 | Buzescu | G06Q 10/109 | 368/29 |
| 2009/0152349 A1* | 6/2009 | Bonev | G06Q 30/00 | 235/383 |
| 2010/0057772 A1* | 3/2010 | Manolescu | G06Q 30/02 | 707/E17.055 |
| 2010/0082357 A1* | 4/2010 | Follmann et al. | | 705/1 |
| 2010/0158207 A1* | 6/2010 | Dhawan | G10L 17/22 | 379/88.02 |
| 2010/0159967 A1* | 6/2010 | Pounds et al. | | 455/466 |
| 2010/0229101 A1* | 9/2010 | Lagerstedt | G01W 1/02 | 715/748 |
| 2011/0106892 A1* | 5/2011 | Nelson | G06Q 10/109 | 709/206 |
| 2011/0184943 A1* | 7/2011 | Norton | G06Q 10/02 | 707/723 |
| 2011/0239158 A1* | 9/2011 | Barraclough | G06Q 10/109 | 715/808 |
| 2011/0313803 A1* | 12/2011 | Friend | G06Q 10/06311 | 705/7.13 |
| 2011/0314402 A1* | 12/2011 | Kikin-Gil | G06Q 10/109 | 715/772 |
| 2011/0314404 A1* | 12/2011 | Kotler | G06Q 10/109 | 715/772 |
| 2011/0314418 A1* | 12/2011 | Kotler | G06Q 10/109 | 715/810 |
| 2012/0030194 A1* | 2/2012 | Jain | G06F 3/0481 | 707/722 |
| 2012/0035925 A1 | 2/2012 | Friend et al. | | |
| 2012/0079397 A1* | 3/2012 | Aizenbud-Reshef | G06Q 10/06311 | 715/751 |
| 2012/0239485 A1* | 9/2012 | Hu | G06Q 30/0207 | 705/14.36 |
| 2012/0297312 A1* | 11/2012 | Lance | G06Q 10/00 | 715/744 |
| 2013/0086480 A1* | 4/2013 | Sirpal et al. | | 715/744 |
| 2013/0132194 A1 | 5/2013 | Rajaram | | |
| 2013/0227431 A1* | 8/2013 | Vasudevan | H04L 65/403 | 715/753 |
| 2013/0252591 A1* | 9/2013 | Sasaki et al. | | 455/414.1 |
| 2013/0297551 A1* | 11/2013 | Smith et al. | | 706/48 |
| 2013/0332525 A1 | 12/2013 | Liu et al. | | |
| 2014/0026088 A1* | 1/2014 | Monte | | 715/765 |
| 2014/0036639 A1* | 2/2014 | Boni et al. | | 368/29 |
| 2014/0059487 A1* | 2/2014 | Baumann | G06F 3/0482 | 715/811 |
| 2014/0075385 A1* | 3/2014 | Wan | G06Q 10/1093 | 715/812 |
| 2014/0082536 A1* | 3/2014 | Costa | G06F 3/0488 | 715/765 |
| 2014/0089418 A1 | 3/2014 | Davenport et al. | | |
| 2014/0096200 A1* | 4/2014 | Brown | G06F 21/6263 | 726/4 |
| 2014/0146200 A1* | 5/2014 | Scott et al. | | 348/231.99 |

OTHER PUBLICATIONS

App Reviews—CrazyMikesapps.com, "HATCHEDit Shareable Calendar Phone App Review (Free App)—CrazyMikesapps", available at <https://www.youtube.com/watch?v=M2EMXZiR-cl>, published on Apr. 8, 2012, 7 pages.*

"Family calendar", Retrieved at <<http://www.cozi.com/help-family-calendar.htm>>, Retrieved Date: Oct. 25, 2012, pp. 3.

Negrino, Tom, "Working with Calendars and Reminders in iCloud", Retrieved at <<http://www.peachpit.com/articles/article.aspx?p=1829132>>, Mar. 15, 2012, pp. 8.

"International Search Report" Mailed Apr. 30, 2014, Application No. PCT/US2014/014519, Filed Feb. 4, 2014.

"Demand and Response Under Article 34," From PCT Application No. PCT/US2014/014519, Filed Aug. 8, 2014.

Written Opinion mailed Jan. 14, 2015 from PCT Patent Application No. PCT/US2014/014519, 7 pages.

International Preliminary Report on Patentability mailed Apr. 27, 2015 from PCT/US2014/014519, 13 pages.

Final Office action mailed Sep. 10, 2015 from U.S. Appl. No. 13/898,461, 21 pages.

Final Office action mailed Sep. 18, 2015 from U.S. Appl. No. 13/754,899, 15 pages.

Response filed Mar. 8, 2016 to the Office Action Mailed Sep. 11, 2015 from European Patent Application No. 14708144.2, 8 pages.

Voluntary Amendment mailed Mar. 24, 2016 from China Patent Application 201480007611.7, 7 pages.

* cited by examiner

THRESHOLD VIEW

BACKGROUND

Today calendars display information that is designed for a classic desktop that has a one-size-fits-all model for representing the data. This makes it hard to see what's going on if there are only a few items, and even harder when trying to view the calendar from greater than normal distances, such as across the room.

SUMMARY

The described concepts relate to threshold views. One example can receive a user instruction to display a threshold view relating to an individual day. This example can scale events associated with the individual day to allow the events to be presented on a display of a device on which a user entered the user instructions. The example can also generate the threshold view for the individual day with the scaled events. The example can also surface real-time information about individual events relating to the individual day of the threshold view.

Another example can include a display, storage, and a processor. The storage can store instructions for execution by the processor. The processor can be configured to process the instructions to create a graphical user interface (GUI) on the display. The GUI can include a threshold view that shows elements that relate to a family on a given day. The elements can include time bound elements, semi-time bound elements, and non-time bound elements.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

This patent relates to presenting useful event information to users. A threshold view can be employed to present the useful event information. The threshold view can show useful event information for a given day or other time period. The threshold view can be configured to relate to a group of users, such as a family. The threshold view can be a single view that shows events for the day that are useful to individual family members and/or the family as a whole. The event information can be 'useful' in that it enables the users to go about their day with less chaos and/or more enjoyment. The threshold view can be configured to take advantage of available display area to enhance the viewing experience on whatever display device is utilized. Accordingly, from one perspective, the threshold view can be thought of as providing an 'optimized view of your day' to the group of users.

First Scenario Examples

Figure 1:
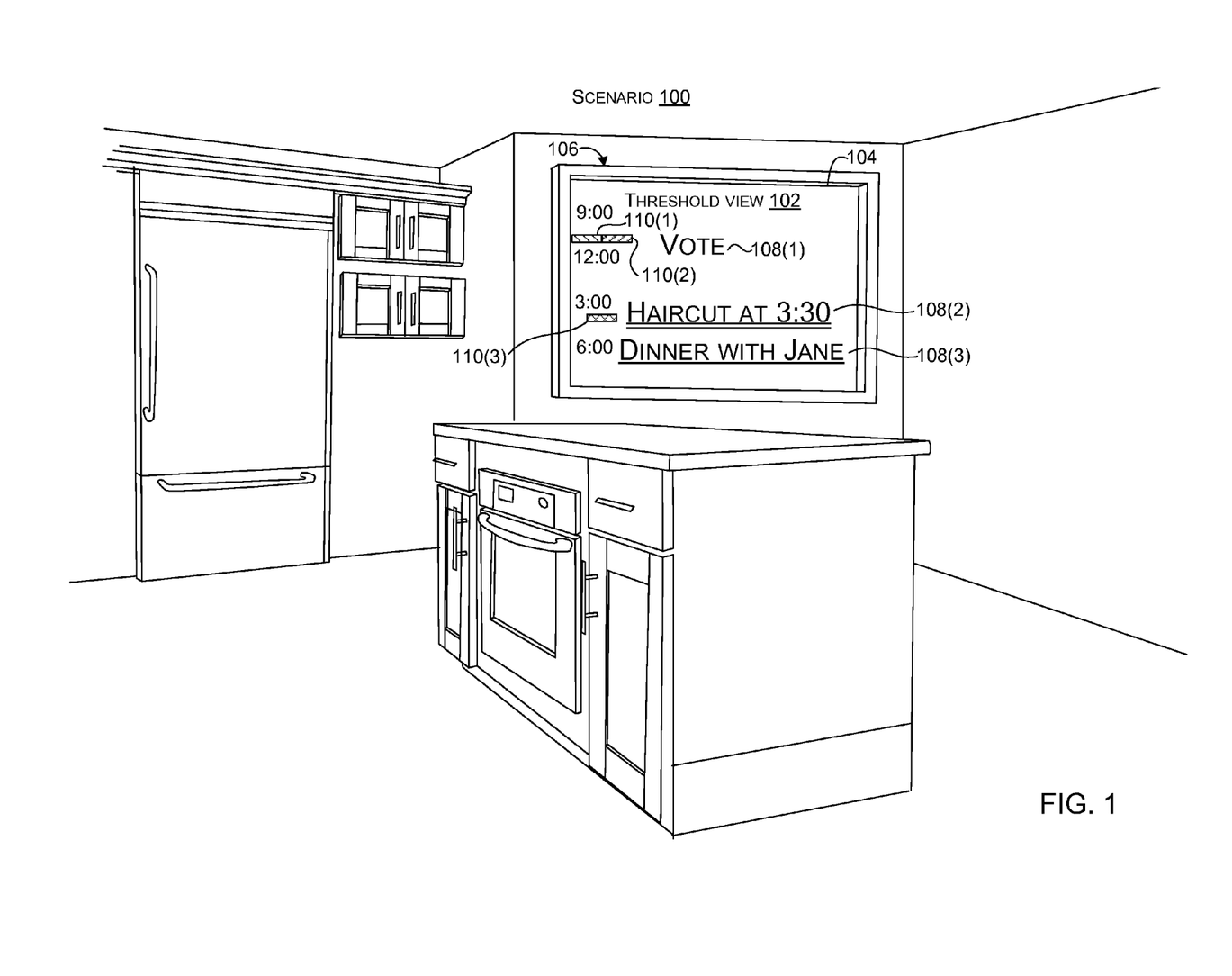
FIGS. 1-2 illustrate scenarios involving examples of threshold views in accordance with some implementations of the present concepts.

For purposes of explanation consider FIG. 1 which shows a first scenario 100 employing an example threshold view 102. The threshold view can relate to a group of people, such as a family, roommates, etc., that have an interest in some events. For purposes of explanation, assume that the family utilizes the threshold view first thing in the morning as they begin their day to help them know what they need to do. In this example, the family consists of a mother (mom), a father (dad), and a son.

In this case, the threshold view 102 is displayed on a screen or display 104 of a monitor or TV 106. The monitor can function as a computer and/or be coupled to a computer (not shown). This example of the threshold view presents various elements including three events 108. The events 108 include a "Vote" event 108(1), a "Haircut at 3:30" event 108(2), and a "Dinner with Jane" event 108(3). An individual event can be shown with an indicator 110 that identifies or indicates who the event relates to. In this example, the indicators 110 are rectangles. Individual family members have a particular pattern in their respective rectangle. Of course, this is only one type of indicator, other indicators may utilize color, objects, avatars, and/or photographs, among others, to identify an individual family member and to associate that family member with an event.

For purposes of explanation, assume that indicator 110(1) identifies the father, indicator 110(2) identifies the mother, and indicator 110(3) identifies the son. Thus, the Vote event 108(1) relates to the parents (e.g., mother and father) as identified by indicators 110(1) and 110(2) and the Haircut at 3:30 event 108(2) relates to the son as identified by indicator 110(3). No indicator is associated with the Dinner with Jane event 108(3). This could be because the Dinner with Jane event relates to all of the family members and/or that the person who created the event chose not to assign the event to anyone.

Threshold view 102 can differentiate events 108 which relate to a specific time of day from events which occur at a general time of day (e.g., morning, afternoon, evening) and from those which are not time bound within the day. For example, the haircut event 108(2) occurs at a specific time of day; in this case 3:30 P.M. This event 108(2) is shown with a double underline to indicate that it occurs at a specific time (e.g., is bound to the specific time). This can be compared to the dinner with Jane event 108(3) which occurs in the evening rather than at a specific time. This event 108(3) is shown with a single underline to indicate that it occurs in the evening (e.g., at a fuzzy time or semi-time bound). Further still, event 108(1) is shown without any underlining to indicate that it is not bound to a particular time within the day. In this case, the Vote event 108(1) is something that the parents want to accomplish during the day, but they can do it whenever is convenient. Of course, other techniques can be utilized to indicate whether individual events occur at a specific time, a fuzzy time, or are not time specific.

Second Scenario Examples

Figure 2:
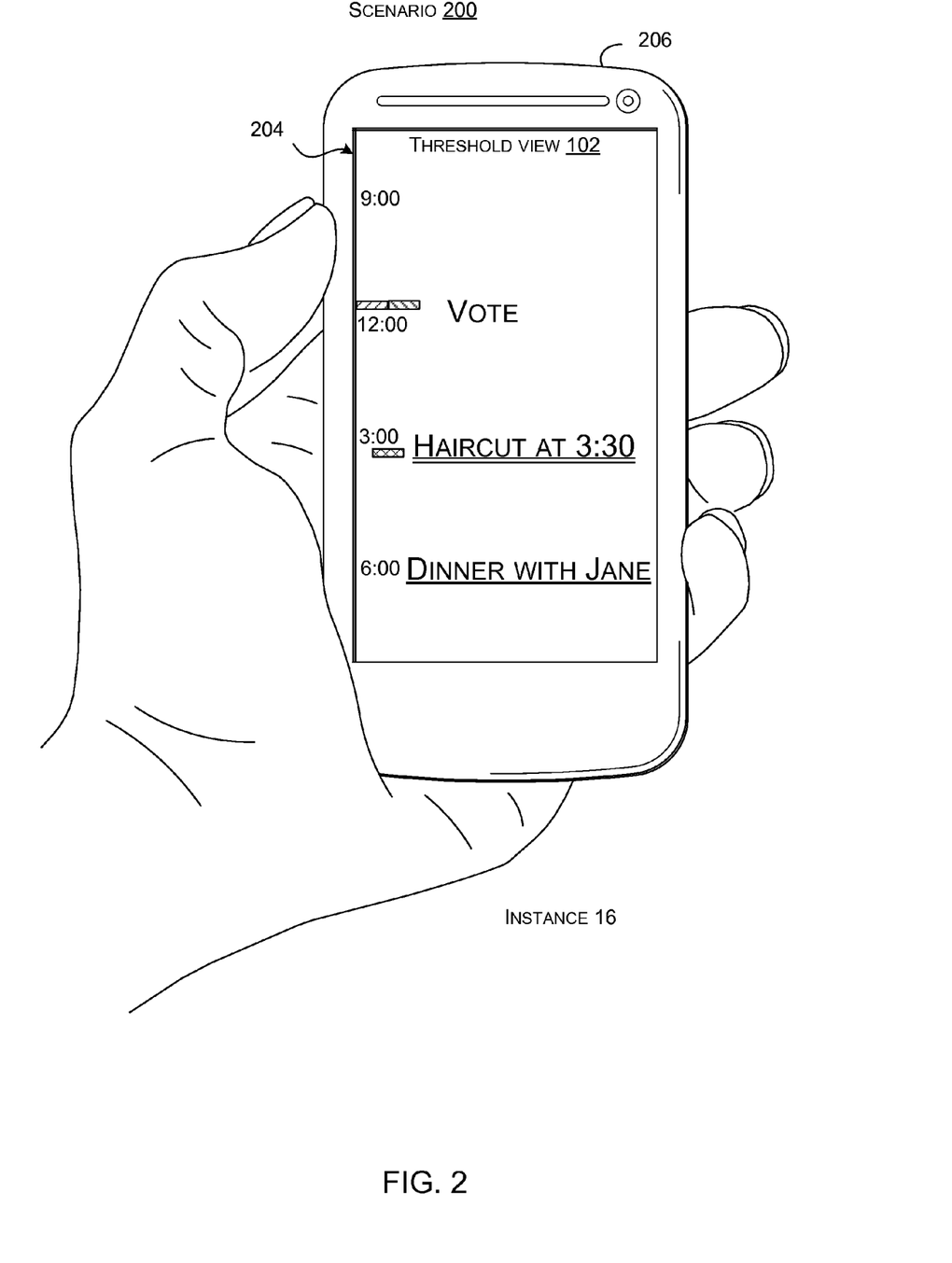

FIG. 2 shows another scenario 200 that involves threshold view 102. Assume for purposes of explanation that the father introduced above relative to FIG. 1 leaves the house for work. He can see the threshold view 102 on the display 204 of his smartphone 206. The threshold view may be reformatted to take advantage of the available space on display 204 but can be similar to the threshold view of FIG. 1 so that it is readily recognized by the father. Thus, the father can seamlessly transition from the threshold view presented on the family's monitor to the threshold view presented on his (e.g., the father's) smartphone 206. From glancing at the threshold view he knows that at any time during the day when he has a few free minutes he can go and vote. He also knows that he needs to pick up his son in time to get him to his haircut at 3:30.

First System Examples

Figure 3:
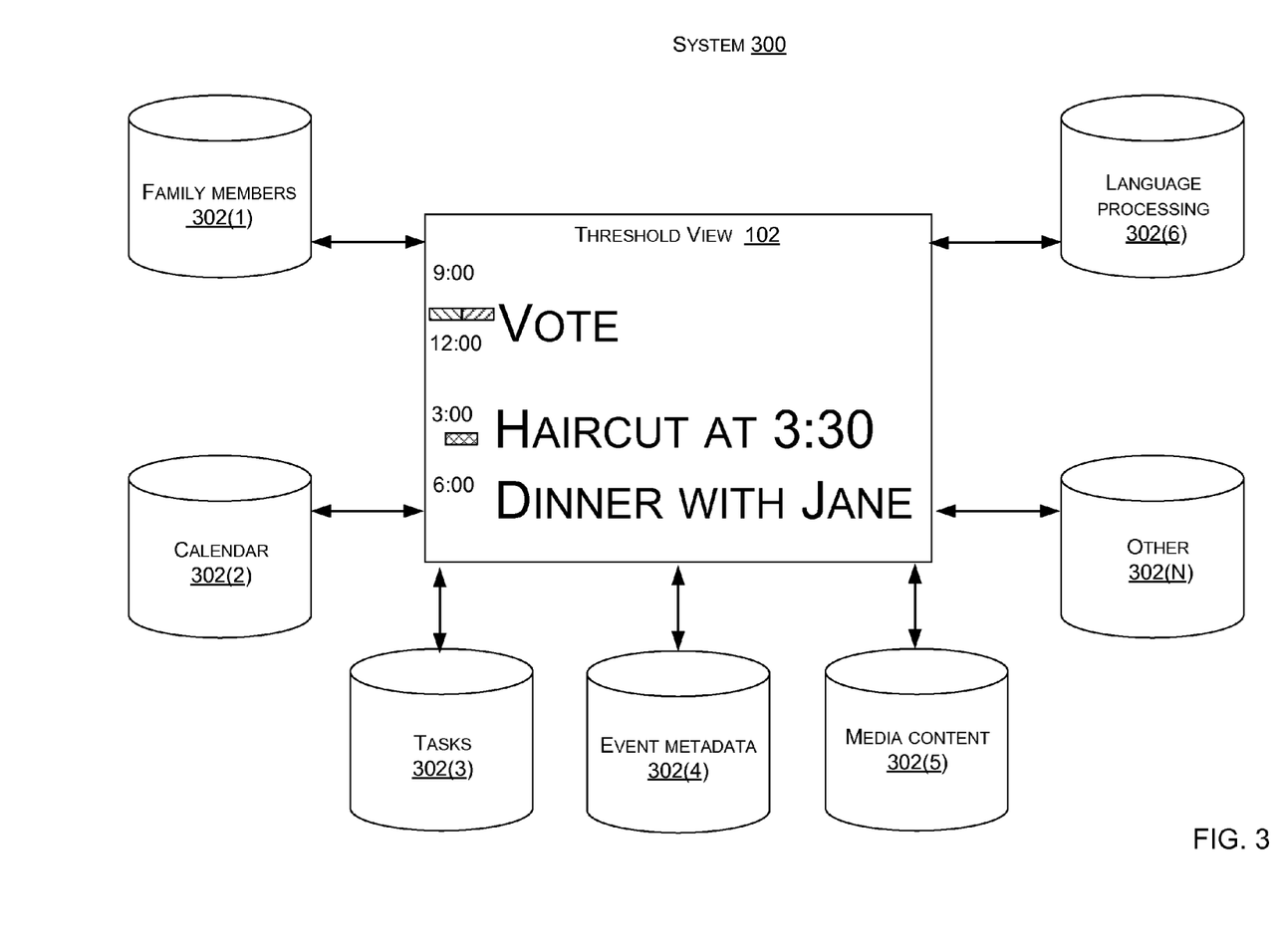
FIGS. 3 and 19 illustrate examples of systems upon which threshold view functionalities can be accomplished in accordance with some implementations of the present concepts.

FIG. 3 shows a system 300 that includes resources 302 that can contribute to the threshold view 102. In this case, the resources include family member resources 302(1), calendar resources 302(2), tasks resources 302(3), event metadata resources 302(4), media content resources 302(5), language processing resources 302(6), and/or other resources 302(N). Examples of other resources can include search engine resources, and monetization resources, among others.

The family member resources 302(1) can include who the family members are and information about individual family members, such as how they want to be identified on the threshold view 102.

The calendar resources 302(2) can include an electronic calendar that stores individual family events that are either bound to a specific time or a fuzzy time. In either case, in the calendar resources, the family event can be associated with a specific time on the calendar resource. The event metadata stored in the event metadata resources 302(4) can include a note that the event actually relates to a fuzzy time rather than a specific time. For example, the calendar resource can store a 'breakfast' event at 6:00 A.M. The associated metadata in the metadata resource can indicate that the event can occur at any time in the morning, such as 5:00 A.M. to 10:00 A.M.

The tasks resource 302(3) can store non-time specific events (e.g., events that relate to a given day, such as "anniversary" and/or events that need to be accomplished on a given day, such as "pack for trip tomorrow".

The media content resources 302(5) can contain images, audio files, and/or documents that can be associated with the threshold view. Any type of media that contributes to the user experience can be associated with the threshold view. For instance, audio, video, or still images, and/or documents, among others can be associated with the threshold view. One such example is described below relative to FIG. 17.

The language processing resources 302(6) can include various types of resources. For instance, the language processing resources can include an autocompletion algorithm to aid a family member in adding or editing an event relative to the threshold view. In another case, the language processing resources can include natural language processing and/or natural language generation (NLP/NLG) algorithms to analyze events and/or other content of the threshold view. Examples utilizing NLP/NLG algorithms are described below relative to FIGS. 11 and 16.

Other resources can include any other resources that can be helpful to creating and/or using a threshold view. Examples are described below relative to FIGS. 11 and 16.

Third Scenario Examples

FIGS. 4-17 collectively show how a family member can add an event to the threshold view 102 and/or utilize the threshold view. In this case, the threshold view 102 is manifest on a display 404 of a pad type device 406. Stated another way, the threshold view can be thought of as a graphical user interface (GUI) presented on a portion or all of the display 404.

Figure 4:
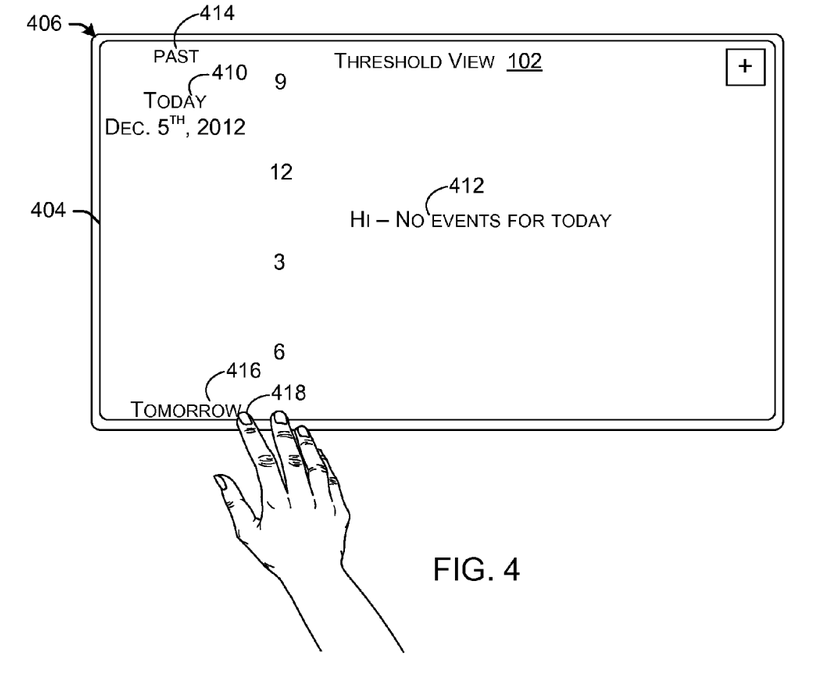
FIGS. 4-18 show examples of threshold views in accordance with some implementations of the present concepts.

In this example, the threshold view is showing "Today Dec. 5, 2012" as indicated at 410. There are no events scheduled for today as indicated at 412. Indicating that no events are scheduled can avoid user confusion that might occur in the alternative scenario where the user sees a blank screen and might think that the threshold view is malfunctioning.

The user can view previous days by selecting "Past" as indicated at 414. Alternatively, the user can look at tomorrow (and subsequent future days) by selecting "Tomorrow" as indicated at 416. In other implementations, the user can simply scroll up to see future days and scroll down to see past days. Some implementations can also allow the user to organize what time units are displayed on the threshold view. For instance, the user might want to see the threshold view cover the whole weekend rather than a single day and then show work days individually. Assume in this case that the user wants to view the threshold view for tomorrow and makes the selection as indicated at 418. In this example, the selection is made by touching the display. Other implementations can allow user selection through a mouse, trackpad, voice recognition, and/or gesture recognition.

Figure 5:
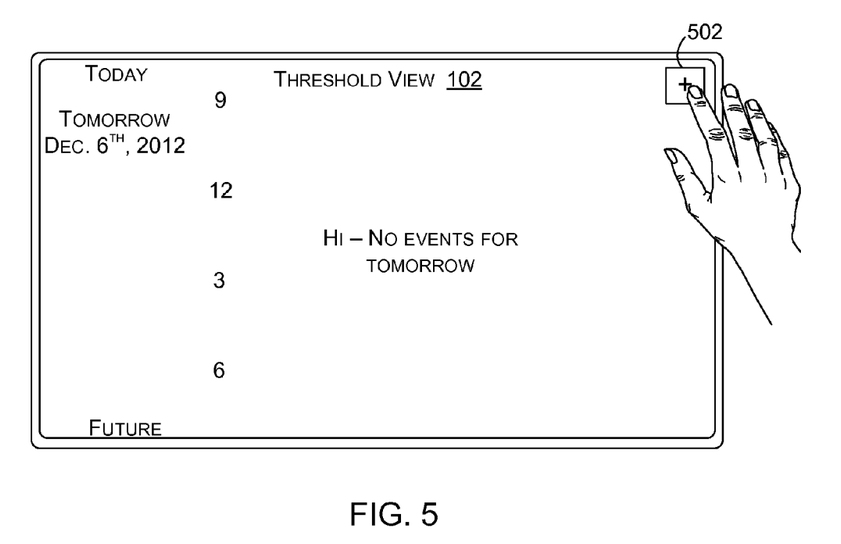

FIG. 5 shows the threshold view 102 for "Tomorrow Dec. 6, 2012" generated responsive to the user selection described relative to FIG. 4. Assume for purposes of explanation that the user wants to add an event to tomorrow's threshold view. As such, the user can select an add (e.g., "+") event option as indicated at 502.

Figure 6:
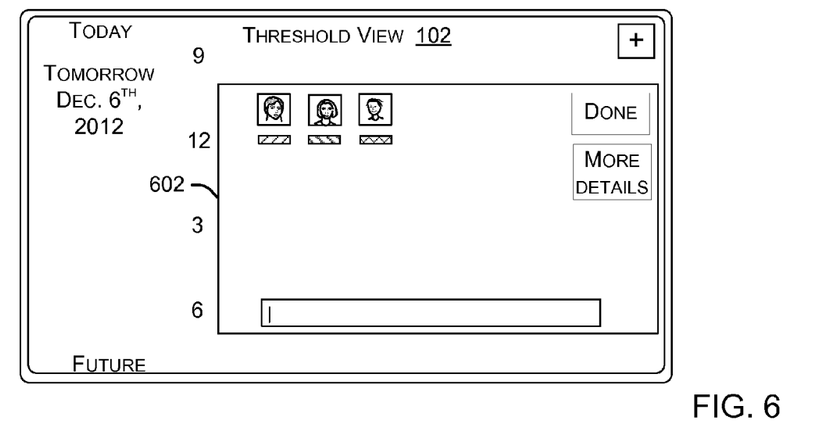

FIG. 6 shows another example of threshold view 102. In this case, the threshold view includes an add event window 602 that is generated responsive to the user action described above relative to FIG. 5.

Figure 7:
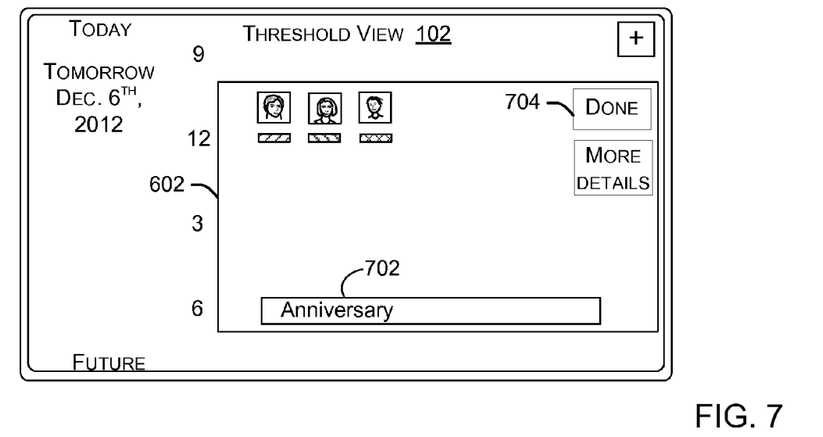

FIG. 7 shows another view where the user adds content in the form of "Anniversary" to the add event window 602 as indicated at 702. Assume that the user then selects a "Done" option 704.

Figure 8:
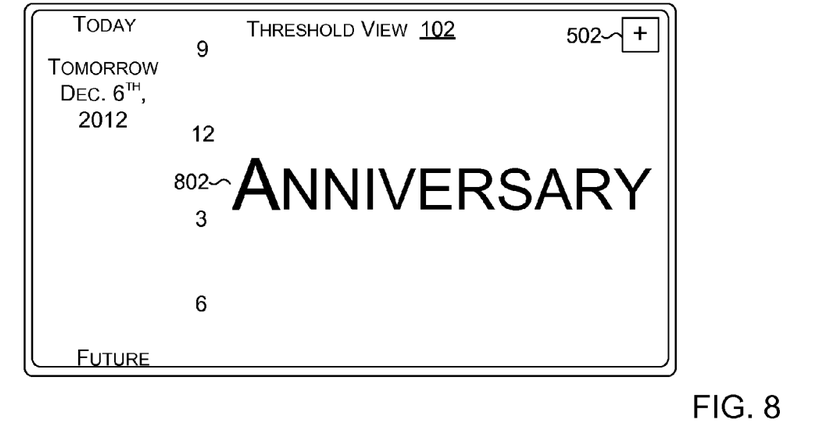

FIG. 8 is another version of threshold view 102 generated responsive to the user action of FIG. 7. In this case, the event "Anniversary" is added to the threshold view as indicated at 802. The "Anniversary" event can be added to the threshold view in a manner that takes advantage of the available display area. For instance, a font size of the "Anniversary" text can be selected to be as large as possible while still fitting on one line of the threshold view, among other criteria.

In this case, based upon the user selections the Anniversary event is not bound to a specific time or a fuzzy time on the threshold view. Further, the Anniversary event is not associated with particular family members. Such an instance can occur when the user simply wants a reminder of something that occurs on that day and doesn't want to associate the event with a particular time or family member since everyone in the family will know the significance of the event and won't need further details. An alternative example is now described starting with the user selecting the add event option 502 in FIG. 8.

Figure 9:
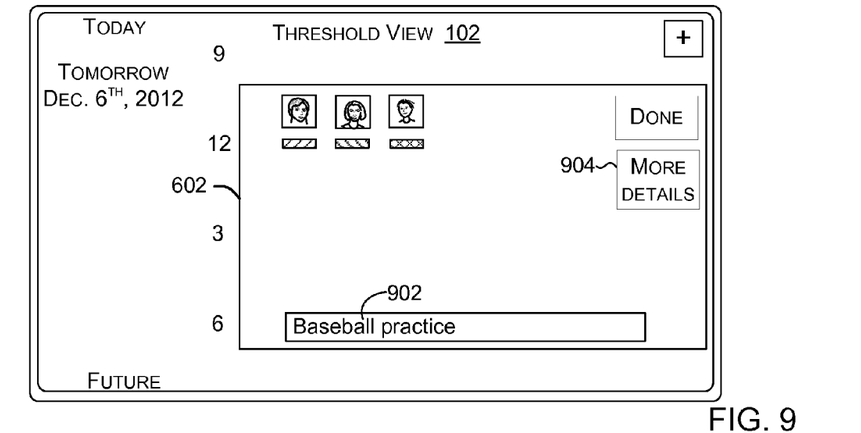

FIG. 9 shows the threshold view 102 with the add event window 602 generated responsive to the user selection relative to FIG. 8. In this case, the user adds "Baseball practice" in the add event window as indicated at 902. The user then selects a "More details" option 904.

Figure 10:
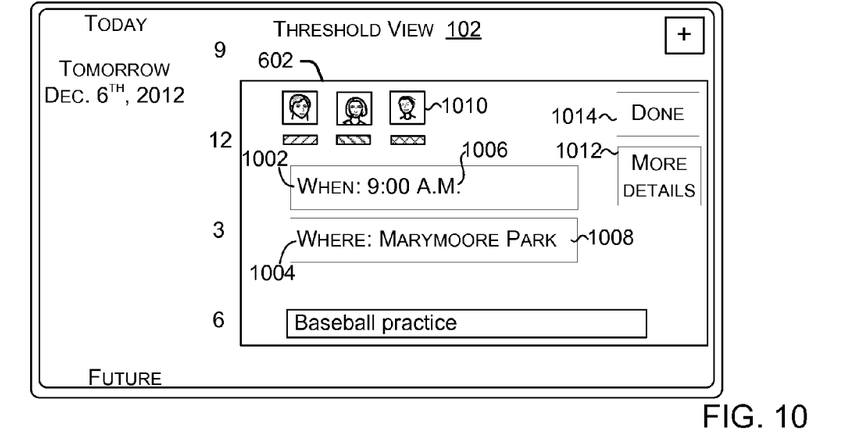

FIG. 10 shows the threshold view 102 with additional fields that allow the user to add "When:" details and "Where:" details 1002 and 1004, respectively. In this case, the user manually adds "9:00 A.M." to the "When:" detail 1002 as indicated at 1006. Similarly, the user manually adds "Marymoor Park" to the "Where:" detail 1004 as indicated at 1008. The user can also click on the picture of the son as indicated at 1010 to associate this event with the son (e.g., "Who:" detail). The user can add more or different details by selecting the "More details" option 1012. In this case, assume that the user has added the details that he wants and as such selects the "Done" option 1014.

Figure 11:
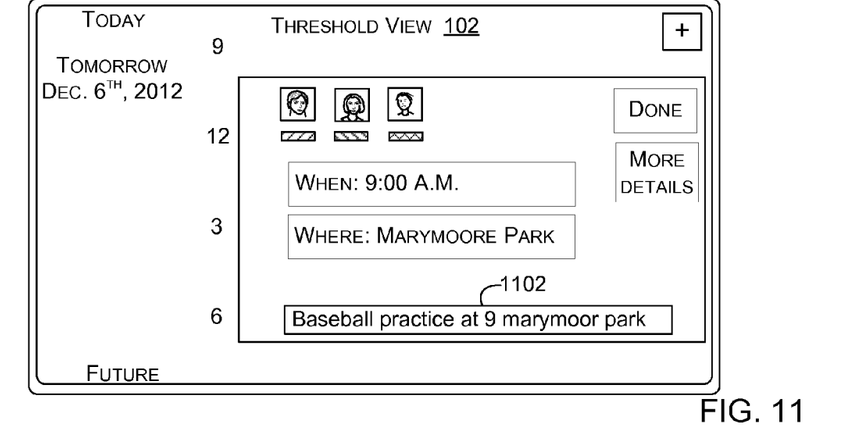

FIG. 11 shows an alternative configuration of the threshold view 102 described relative to FIGS. 9-10. In this case, the user adds content to the add event window 602 as indicated at 1102. This content can be analyzed with various algorithms, such as NLP/NLG algorithms to understand the user content. The results of the analyzing can be utilized to autopopulate the "When:" and "Where:" detail 1002 and 1004. Of course, this is just one example of how the user content can be analyzed to make event creation easier for the user. In another example, the user might speak or type "Mike (e.g., the son) has baseball practice tomorrow morning at nine at Marymoor Park". The user content can be analyzed to autopopulate the event. Further still, the analyzing may include accessing other events, such as the family's previous events and utilizing this information to aid in completing the event. For instance, as the user spoke "Mike has baseball practice tomorrow morning . . . ". The analysis may indicate that Mike's morning practices have previously been at 9:00 A.M. at Marymoor Park. This information can be autosuggested and/or autopopulated into the event details even before the user finishes the sentence. Thus, ease of use for creating events on the threshold view can further encourage users to utilize the threshold view.

Figure 12:
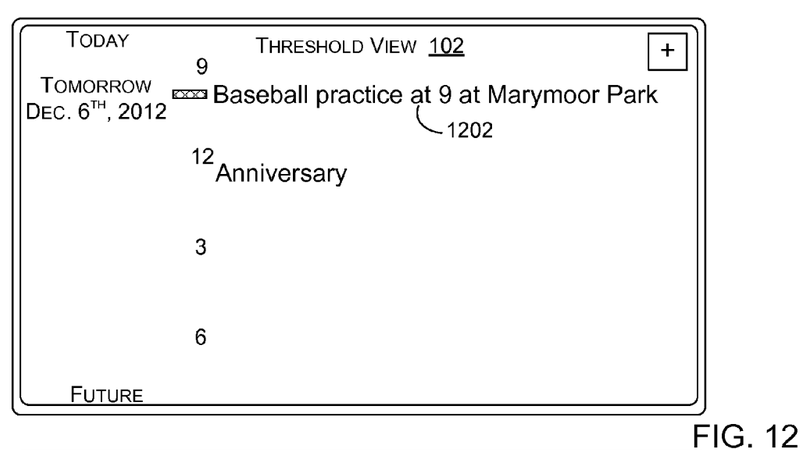

FIG. 12 shows the threshold view 102 responsive to the actions described relative to either of FIG. 10 or 11 to add the baseball practice event 1202 "Baseball practice at 9 at Marymoor Park". In this example, the font size is reduced in order to keep the baseball practice event on one line (compare FIG. 8 to FIG. 12). In another implementation, the event may be populated on multiple lines to allow a larger font size to be utilized.

Figure 13:
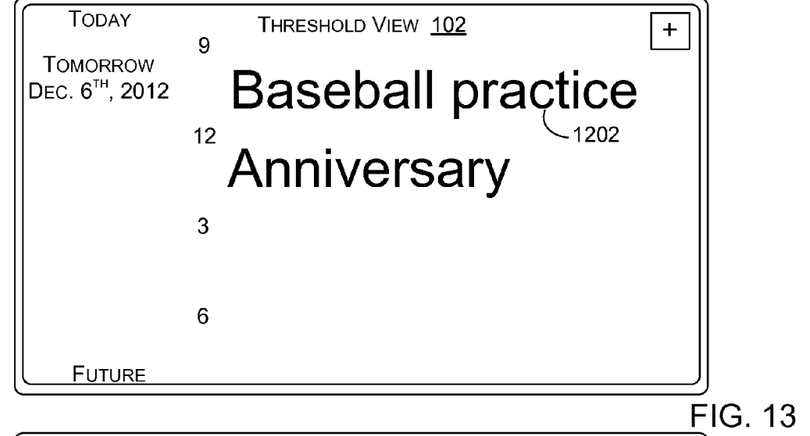

FIG. 13 shows an alternative version of threshold view 102 compared to FIG. 12. In this case, the baseball practice event 1202 is displayed in abridged form (e.g., displayed as "Baseball practice" rather than "Baseball practice at 9 at Marymoor Park"). This configuration can allow a larger font size to be employed for the events of the threshold view 102 (compare FIG. 13 to FIG. 12). In this case, the user can select the baseball practice event 1202 to see more about the event. Assume for purposes of explanation that the user selects the baseball practice event of FIG. 13.

Figure 14:
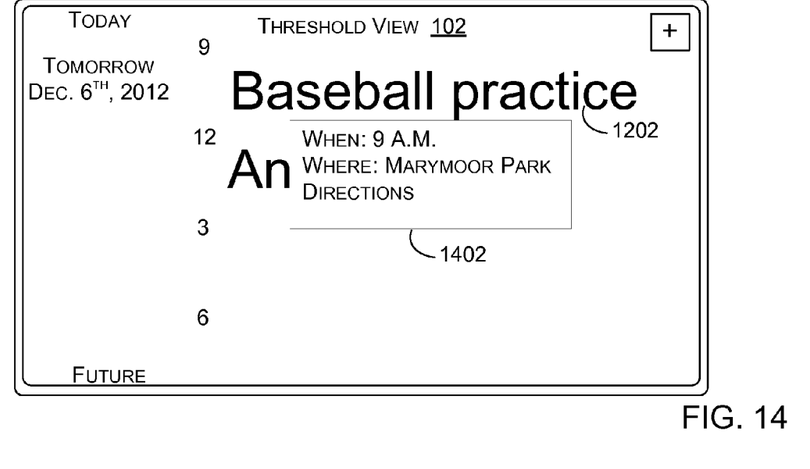

FIG. 14 shows the threshold view 102 responsive to the user selection of FIG. 13. In this case, additional details about the baseball practice event 1202 are shown proximate to the event at 1402. These additional details can be displayed for a period of time and then removed or faded from view. The details can of course be handled in other ways that are not illustrated.

Figure 15:
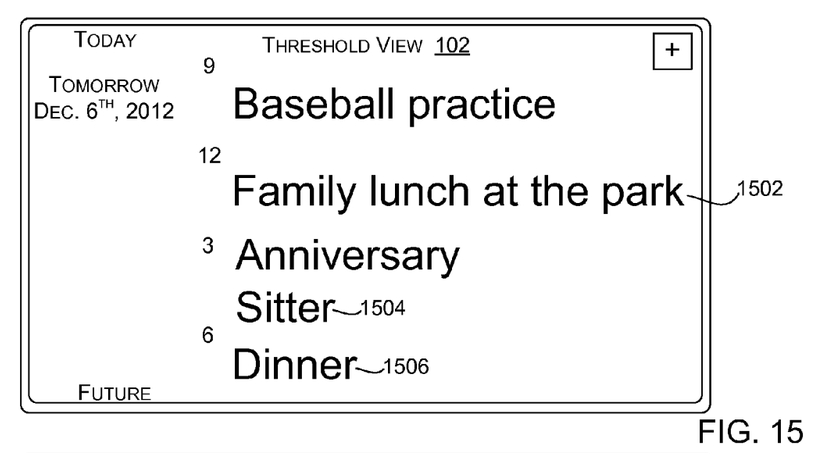

FIG. 15 shows a subsequent instance of the threshold view 102. In this case, assume that the users have added three more events: a "Family lunch at the park" event 1502, a "Sitter" event 1504, and a "Dinner" event 1506. Once again the events are formatted to take advantage of the available display area. In some implementations, the formatting can include scaling the events based upon a number of events and/or a length of individual events. One technique for taking advantage of the available display area can entail selecting the largest font of a set of fonts. The events can then be evaluated to determine if they take advantage of the available display area at that font size. For instance, can each of the events be displayed on a single line in the display area at that font size and/or can all events fit on the threshold view at that font size? If so, the threshold view can utilize that font size for the events. If not, a next smaller font size can be selected and the evaluation can be repeated. Recall that an alternative configuration was discussed above relative to FIGS. 12-14 where the amount of text displayed for an event was abridged to allow a larger font size to be used in the threshold view.

Note also that the threshold view 102 can offer additional features to aid the user. For example, the user can select any of the events to access additional functionality. Assume in this case that the user selects the Anniversary event in FIG. 15.

Figure 16:
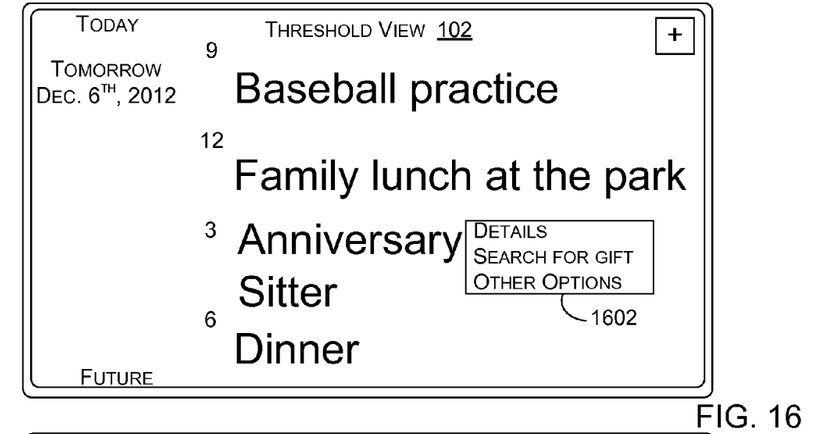

FIG. 16 shows an option window 1602 generated responsive to the user action of FIG. 15. In this case, the option window includes a "Details" option, a "Search for Gift" option and a "Other options" option. In some configurations, the options window could be static or preconfigured for all events. In other implementations, the options listed in the options window can be 'smart' options. For instance, the event (e.g., "Anniversary") could be used as a search query to determine that users often search for anniversary gifts. The search for anniversary gifts option can then be populated in the options window for the user's convenience. Further, information from the resources described relative to FIG. 3 could be utilized to search automatically for gifts. For instance, the resources could identify how long the parents have been married, where they tend to shop, what they tend to buy, their birthstones, etc.

This information could then be utilized in conjunction with other resource information relating to what other people tend to buy for anniversary gifts. This combined information could be utilized to provide a customized search for the user. Of course, this is but one example of how resources that are specific to the user (e.g., their email history, text history, shopping history, location, personal data (e.g., birthdate), among others) can be utilized in combination with information available on the internet (e.g., birthstones by month) to aid the user on the threshold view. Of course, user privacy can be protected and/or maintained while providing such features. For instance, the user may be requested to authorize the use of their personal information prior to commencement of such use.

Figure 17:
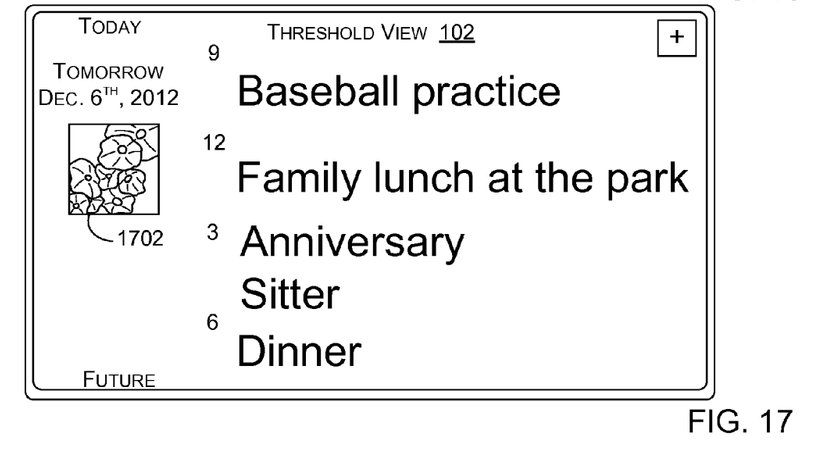

FIG. 17 shows the threshold view 102 at a subsequent point where the user has added media that relates to the family and/or the events. In this case the media is a picture of flowers as indicated at 1702. For example, assume that the husband sees the anniversary event and finds a picture of his wife's favorite flowers and adds them to the threshold view. Adding the picture can be easily accomplished. For example, the user can drag the image from another graphical window into the threshold view 102. Alternatively, the user can copy and paste the image into the threshold view. Of course other options for adding the media to the threshold view can be supported. Further, some implementations can analyze the events and suggest media that might be enjoyable to the family. For instance, for a "concert" event, music from the performer may be located and suggested for the user. Similarly, if the event is "movie night", movie trailers could be suggested for and/or populated into the threshold view. In still other cases, the user may make a list (such as a grocery store list) and drag it into the threshold view next to an event "shopping".

In another case, where the family has engaged in similar events in the past, images from the previous events may be identified and suggested for and/or populated to the threshold view. For example, if an event is "Day at the beach", the threshold view can be populated with images from the last time the family went to the beach. The images can be obtained from resources associated with the family or family members. For example, the family's 'photos folder' can be accessed to obtain the images.

Figure 18:
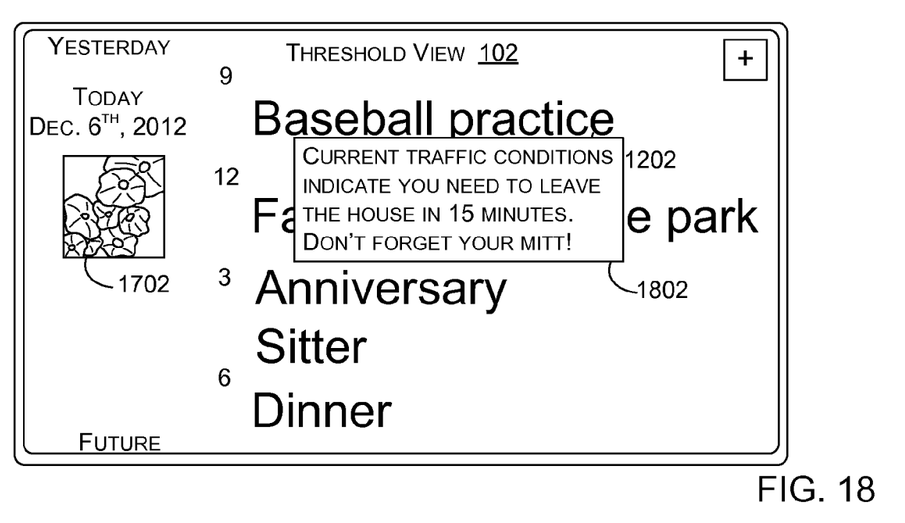

FIG. 18 shows another version of the threshold view generated the next morning. Assume in this case that each of the family members (e.g., mom, dad, and son) has a smartphone and that they have previously given permission for the threshold view to utilize their personal location information as supplied by their respective smart phones. Assume further that the location information indicates that each family member is currently at home. In this case, the threshold view includes a smart reminder 1802 relative to the Baseball practice event 1202 that says, "Current traffic conditions indicate you need to leave the house in 15 minutes." Thus, this smart reminder is produced from real-time location data, mapping data, and traffic data. The smart reminder also states, "Don't forget your mitt!". This information can be obtained from NLP/NLG analysis of the event and resource information, such as texts about previous baseball practices. Of course, other types of smart reminders can also be generated for the threshold view.

In summary, the threshold view can surface various additional information that may be of interest to the family members. The additional information can include real-time information, such as location-based information, search results, weather conditions, traffic conditions, etc. Further, the surfaced information may include details obtained by analyzing the event and/or other information from or about the user (e.g., that the user needs his mitt at baseball practice).

Second System Examples

Figure 19:
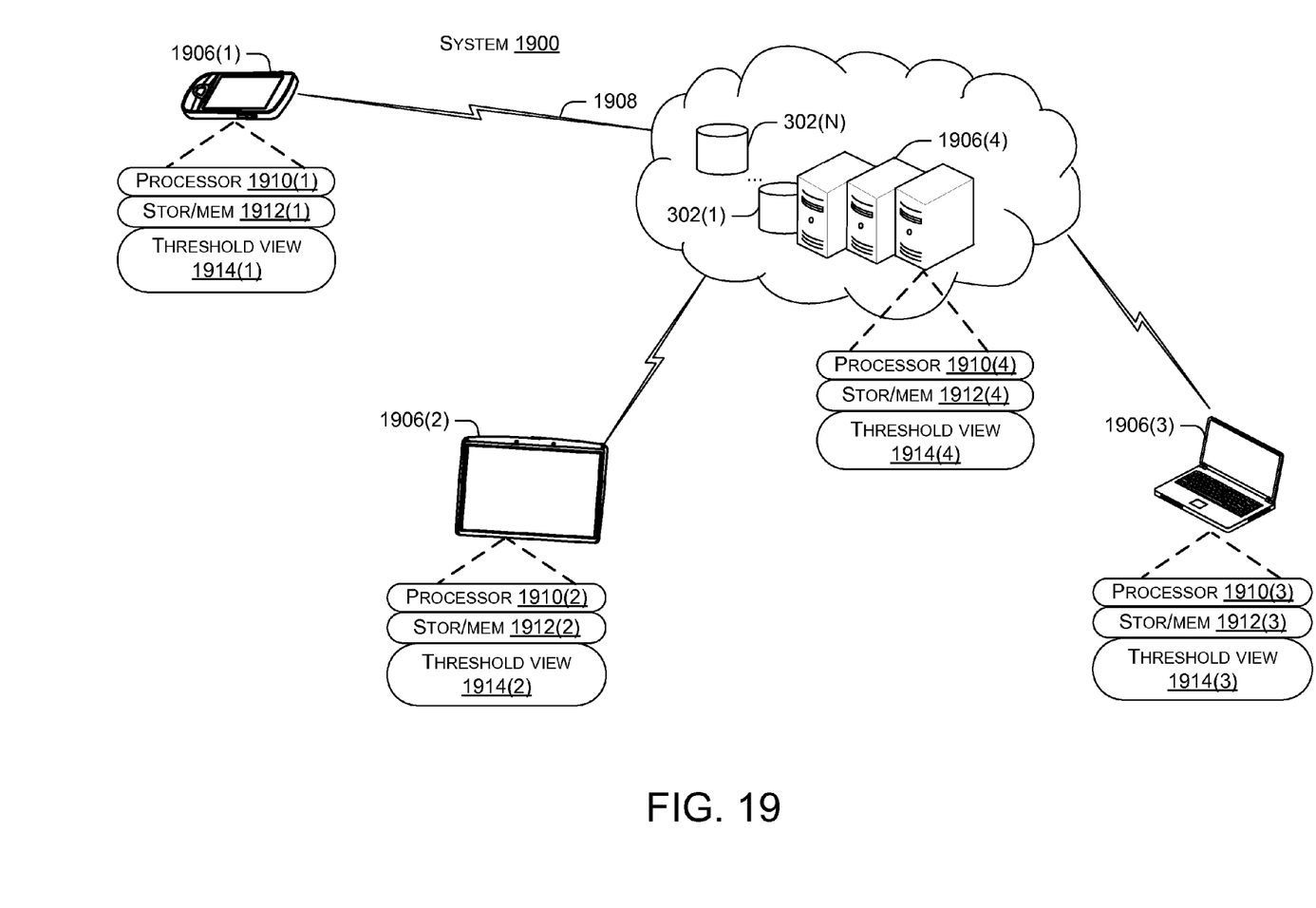

FIG. 19 shows system 1900 that can enable the threshold view concepts described above. In this example, the system 1900 includes several devices 1906 which can be similar to devices 106, 206 and/or 406 described above. In this case, the devices 1906 are manifest as a smartphone type computer 1906(1), a pad type computer 1906(2), a notebook type computer 1906(3), and a set of cloud-based server type computers 1906(4). (In this discussion, the use of a designator with the suffix, such as "(1)", is intended to refer to a specific device instance. In contrast, use of the designator without a suffix is intended to be generic). Of course, not all device implementations can be illustrated and other device implementations should be apparent to the skilled artisan from the description above and below.

The devices 1906 can communicate over one or more networks 1908 (represented by 'lightning bolts'). The devices can also communicate with resources 302. Examples of resources 302(1)-302(N) are described above relative to FIG. 3. In some cases, the present concepts can be implemented by an individual device 1906 acting in isolation. In other cases, a device can implement the present concepts by operating cooperatively with one or more other devices and/or the resources 302. These variations are described in more detail below.

Devices 1906 can include several elements which are defined below. For example, these devices can include a processor 1910, storage/memory 1912, and/or a threshold view component 1914. The devices can alternatively or additionally include other elements, such as input/output devices (e.g., touch, voice, and/or gesture), buses, graphics cards, Wi-Fi circuitry, cellular circuitry, positional circuitry (absolute location (e.g., GPS) and/or relative location (e.g., accelerometers, magnetometers, among others) etc., which are not illustrated or discussed here for sake of brevity.

The term "device", "computer", or "computing device" as used herein can mean any type of device that has some amount of processing capability and/or storage capability. Processing capability can be provided by one or more processors (such as processor 1910) that can execute data in the form of computer-readable instructions to provide a functionality. Data, such as computer-readable instructions, can be stored on storage, such as storage/memory 1912 that can be internal or external to the computer. The storage can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage medium/media includes "computer-readable storage devices." Examples of computer-readable storage devices include volatile storage media, such as RAM, and non-volatile storage media, such as hard drives, optical discs, and flash memory, among others.

Examples of devices can include traditional computing devices, such as personal computers, desktop computers, notebook computers, cell phones, smart phones, personal digital assistants, pad type computers, mobile computers, cameras, or any of a myriad of ever-evolving or yet to be developed types of computing devices. A mobile computer can be any type of computing device that is readily transported by a user and has a self-contained power source (e.g., battery).

In the illustrated implementation devices 1906 are configured with a general purpose processor 1910 and storage/memory 1912. In some configurations, a device can include a system on a chip (SOC) type design. In such a case, functionality provided by the device can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPU), graphical processing units (CPUs), controllers, microcontrollers, processor cores, or other types of processing devices suitable for implementation both in conventional computing architectures as well as SOC designs.

In some configurations, the threshold view component 1914 can be installed as hardware, firmware, or software during manufacture of the device 1906 or by an intermediary that prepares the device for sale to the end user. In other instances, the end user may install the threshold view component 1914, such as in the form of a downloadable application.

In some configurations, individual devices 1906 can include robust threshold view components. Such a device can operate independently to generate the threshold view. For instance, notebook computer 1906(3) could include a self-contained threshold view component that generates the threshold view utilizing resources 302, with or without other computers. In another configuration, a set of computers belonging to a family could each include threshold view components. Any changes to the threshold view on one computer can be communicated to the other computers (e.g., the computers can synchronize their threshold view data). In other cases, the threshold view for the family may be coordinated from a central point, such as a cloud-based application or service and the individual devices can update to and from the cloud-based application. Such a configuration can lend itself to allowing individual devices to have less robust or thin threshold view components where a majority of the functionality is performed by other devices, such as cloud based devices, for presentation on the thin device. In some cases, the local device can provide a web-view of content generated remotely, such as by the cloud based devices.

Stated another way, in some implementations, an individual device, such as device 1906(1) may have a less robust instance of the threshold view component 1914(1) such that some or all of the functionality provided by the threshold view component 1914(1) is performed remotely, such as at cloud-based device 1906(4) and communicated back to device 1906(1) for presentation to the user. Further, the threshold view component may include individual resources 302 or access individual remote resources. For example, the threshold view component may include a NLP/NLG resource or may access a remote NLP/NLG resource.

The threshold view component 1914 can be a freestanding application or the threshold view component can be an element of a contact management application or a calendaring application, among others. Examples of contact management applications can include Outlook® from Microsoft® Corporation, Apple Contacts™ and/or Google Gmail™.

The threshold view component 1914 can facilitate setting up the threshold view. In one case, an individual family member, such as a family member having a user account can set up the threshold view and add the user accounts of the other family members. The individual calendars of the family members can then be accessed by the threshold view application. Each user could then access the threshold view and add, edit, and/or delete events from their user accounts. Such a configuration can then make an event log of events relating to the threshold view. The event log can show who created an individual event and when. The log can also show if the event was edited or deleted, by whom and when.

Other implementations can be configured to accommodate the fact that children (or others) may or may not have user accounts, but can be included in the threshold view. To accommodate these circumstances, a less formal approach can be employed. For example, a user, such as a user that has a user account, can set up the threshold view for a family and add the family members. Any of the family members can then view the threshold view and add, edit, and/or delete events. An event log can be maintained in such a configuration, but in some cases the event log may contain less information than in the more formal configuration described above. For instance, the event log can show when an event was created, edited, and/or deleted, but it may not always be clear who made the changes. For example, recall that in the scenario of FIG. 1, the threshold view was displayed on a family device (e.g. monitor 106). In such a configuration, in order to enhance ease of use, any family member can make changes to the threshold view without changing users or other formalities. Thus, the event log may not indicate who made the change, but the event log can indicate that a change was made and when.

Of course, even with an informal configuration, changes made through an individual device (e.g. dedicated device), such as individual user's smart phone, can be associated with that user in the event log. Even with shared devices, some implementations can determine which family member is changing the threshold view. For example, gesture recognition technologies may be able to distinguish between individual family members. For instance, assume in one example, that the monitor of FIG. 1 is connected to an entertainment console that includes gesture recognition technologies. One such commercially available product is the Xbox® Kinect® from Microsoft® Corp.

The entertainment console could generate the threshold view for display on the monitor. The family member could control the threshold view by making gestures and/or speaking to the entertainment console. The entertainment console could identify the family member based upon various parameters associated with their physical size, movements, etc. Alternatively or additionally, the entertainment console could distinguish the family member by analyzing their voice. This information can be added to the event log as the family member makes changes to the threshold view. The information could also be utilized on the threshold view. For instance, the dad might say, "I need to take the dog to the vet tomorrow." Voice recognition technologies could capture the statement as text and NLG/NLP technologies can be utilized to analyze the statement and determine the intent. The analyzed intent can be utilized to populate the event on the threshold view. Voice analysis technologies could be utilized to determine who the speaker is. For instance, the present speech could be compared to previous speech patterns that are known to be from individual family members to determine a match. As a result, the event can be automatically added to the threshold view and the dad can automatically be identified as being associated with creation of the event. Of course, these and/or similar technologies can be utilized on other types of computers.

First Method Example

Figure 20:
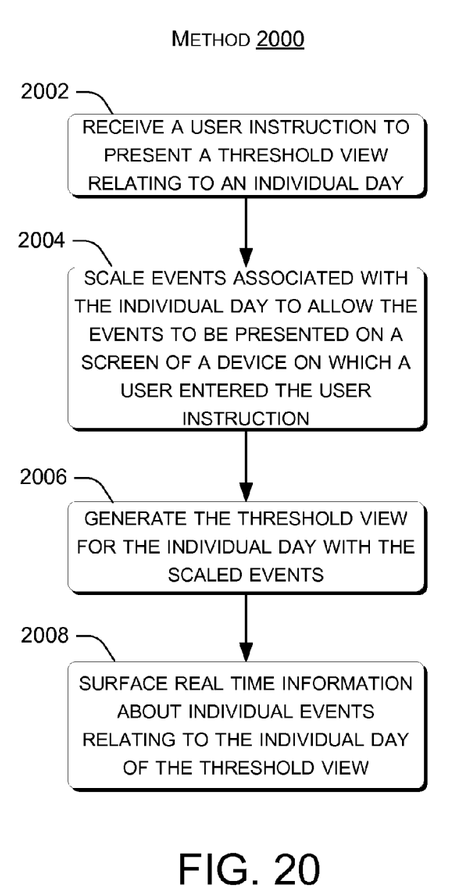
FIGS. 20-21 are flowcharts of threshold view methods that can be accomplished in accordance with some implementations of the present concepts.

FIG. 20 shows a flowchart of a method 2000 relating to threshold views.

The method can receive a user instruction to present (e.g., display) a threshold view relating to an individual day at 2002. In some cases, the receiving can occur at a user device (e.g., a device that the user is engaging). In other cases, the receiving can entail the user device sending the user information to another receiving device.

The method can scale events associated with the individual day to allow the events to be presented on a screen or display of a device on which a user entered the user instruction at 2004. In some cases, the scaling can entail applying a largest font size from a set of fonts to the events associated with the individual day. In an instance where each event can be displayed on the display at the same time (e.g., all the events fit on the display together), then the largest font size can be utilized. Otherwise, the process can be repeated with a next largest font size until the events can be displayed at the same time.

Viewed from another perspective, one process can be thought of as incrementally decrementing through a range of font sizes until display parameters are satisfied. For instance, the display parameters can relate to displaying each individual event on a single line of the display and/or fitting all of the scaled events on the display so that all of the events can be viewed by the user at once.

The method can generate the threshold view for the individual day with the scaled events at 2006. The generating can entail presenting the threshold view on the device or sending the threshold view to the device for presentation.

The method can surface real-time information about individual events relating to the individual day of the threshold view at 2008. In one case, the surfacing real-time information can entail surfacing weather information related to the individual events, surfacing traffic related information related to the individual events, or surfacing location information related to the individual events, among others.

Second Method Example

Figure 21:
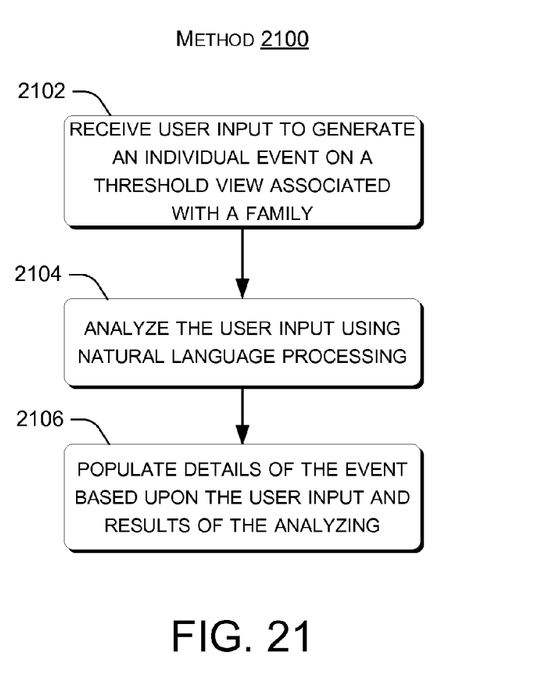

FIG. 21 shows a flowchart of a method 2100 relating to threshold views.

The method can receive user input to generate an individual event on a threshold view associated with a family at 2102. The threshold view can be manifest as a graphical user interface relating to a day that displays events associated with that day. For example, the receiving user input can entail receiving user text entry, user speech, and/or a user gesture.

The method can analyze the user input using natural language processing at 2104. In some cases the method can further analyze other user data. The results of the analyzed user input and the analyzed other user data can be utilized to populate the event. Some examples of analyzing other user data can include analyzing other events on the threshold view, analyzing user accounts associated with the user, analyzing user emails, analyzing user texts, analyzing user search history, or analyzing user documents.

The method can populate details of the event based upon the user input and results of the analyzing at 2106. Examples of such details can include the day, a time of the day, who the event is associated with, or a location of the event, among others.

The order in which the methods are described is not intended to be construed as a limitation, and any number of the described blocks can be combined in any order to implement the method, or an alternate method. Furthermore, the method can be implemented in any suitable hardware, software, firmware, or combination thereof, such that a computing device can implement the method. In one case, the method is stored on computer-readable storage medium/media as a set of instructions such that execution by a computing device causes the computing device to perform the method.

CONCLUSION

Although techniques, methods, devices, systems, etc., pertaining to threshold views are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method performed by one or more processors, comprising:
receiving a user instruction from a user to present a threshold view associated with a family of the user;
responsive to the user instruction, generating the threshold view to be presented on a screen of a computing device on which the user entered the user instruction, wherein events associated with an individual day are presented within the threshold view; and,
responsive to the user instruction, using resources to obtain personalized information about an individual event to surface within the threshold view, the resources including natural language processing resources and search engine resources, the using the resources comprising:
using the natural language processing resources to perform an analysis of the individual event, previous related events, and information resources that are specific to the user and the family of the user,
generating customized event information based on the analysis, wherein the customized event information comprises a reminder derived from the analysis of the previous related events and a contextual media item associated with at least one of the previous related events and retrieved from the information resources,
generating an internet search query that is customized for the user and the individual event and using the search engine resources to obtain real-time information associated with the individual event, wherein the real-time information comprises at least one of location-based information, weather conditions, and traffic conditions, and,
surfacing the personalized information about the individual event, wherein the personalized information includes the generated customized event information and the obtained real-time information.

2. The method of claim 1, performed by the computing device.

3. The method of claim 1, wherein the generating the threshold view comprises providing an indication relative to an individual event of the threshold view whether the individual event is a time bound event, a semi-time bound event, or a non-time bound event.

4. The method of claim 1, performed by another computing device by communicating with the computing device.

5. The method of claim 1, wherein the surfacing the personalized information about the individual event is performed without further input from the user beyond the user instruction to present the threshold view relating to the individual day.

6. The method of claim 1, wherein the using the search engine resources comprises accessing traffic resources and a result of the internet search query comprises the traffic conditions.

7. The method of claim 1, further comprising scaling and abridging the events associated with the individual day to allow the events to be presented at a different scale and with a different amount of event information within another threshold view on another screen of another computing device, the another screen being a different size than the screen.

8. A system, comprising:
one or more processing devices; and
a storage device storing computer-readable instructions which, when executed by the one or more processing devices, cause the one or more processing devices to:
create a graphical user interface (GUI) on a display, the GUI comprising a threshold view that shows elements that relate to a family, on a given day,
receive user input from a family member of the family and associate the user input with an individual element of the threshold view, and
responsive to the user input, obtain personalized information about the individual element to generate an updated GUI, the personalized information obtained using resources, comprising:
 using natural language processing resources to perform an analysis of the individual element, previous related elements, and information resources that are specific to the family,
 generating customized information based on the analysis, wherein the customized information comprises a reminder derived from the analysis of the previous related elements and a contextual media item associated with at least one of the previous related elements and retrieved from the information resources,
 generating an internet search query that is customized for the family and the individual element using search engine resources to obtain real-time information associated with the individual element, wherein the real-time information comprises at least one of location-based information, weather conditions, and traffic conditions, and
 surfacing the personalized information about the individual element, wherein the personalized information includes the generated customized information and the obtained real-time information.

9. The system of claim 8, wherein the individual element is shown on the GUI with an indication of whether the individual element is time bound, semi-time bound, or non-time bound.

10. The system of claim 8, wherein the computer-readable instructions further cause the one or more processing devices to:
scale the individual element based on a size of the GUI, lengths of the elements, and how many of the elements are shown.

11. The system of claim 10, wherein the individual element is shown on the GUI with an indicator configured to indicate which family member is associated with the individual element.

12. The system of claim 10, wherein the threshold view further includes media that relates to the family or to the individual element.

13. The system of claim 10, wherein the elements are events.

14. The system of claim 8, wherein the user input comprises a user gesture.

15. The system of claim 8, embodied on a single device.

* * * * *